UNITED STATES PATENT OFFICE.

NELSON B. ARNOLD, OF NEW YORK, N. Y.

COMPOSITION OF MATTER TO BE USED AS A PAINT.

1,175,110.　　　　Specification of Letters Patent.　　Patented Mar. 14, 1916.

No Drawing.　　Application filed March 6, 1915.　Serial No. 12,498.

*To all whom it may concern:*

Be it known that I, Nelson B. Arnold, a citizen of the United States, residing in the borough of Brooklyn, county of Kings, city and State of New York, have invented a new and useful Composition of Matter to be Used as a Paint, of which the following is a specification.

The object of the invention is to provide a new and improved composition of matter to be used as a paint for general purposes and particularly on surfaces exposed to the elements or influences calculated to cause deterioration of color or materials.

The usual practice for a long period of time has been to use carbonate of lead and zinc oxid in various proportions together with oil and different extenders, it being the theory that either the lead or zinc alone was open to objections which made the combination necessary.

If lead is used without zinc it chalks or crumbles and the treated surface becomes dry and powdery and has little protecting power. It absorbs oxygen, destroys the oil, and does not stand moisture well. It also has a tendency to darken on exposure especially in localities where the air is permeated with certain gases. In addition as is well known there is always more or less danger of lead poisoning involved in the use of lead.

Zinc oxid, while it does not possess the density or body of lead, has many advantages. While a zinc film is thinner and its hiding power is not as great, it is much more durable. In my composition the zinc absorbs a much greater quantity of oil which is not injuriously affected by the zinc and thereby the life of the treated surface is prolonged. Upon exposure it does not darken like the lead pigment and because of the purity of its whiteness, when used with colors the tints are brighter originally and maintain their color longer.

Heretofore when zinc has been used without lead the other ingredients have not been proportioned so that the mixture would readily adhere to the surface being covered, but the proportions of the ingredients in my invention are such that this difficulty is overcome, the hiding power is increased and after the surface is dry cracking and peeling are prevented.

I use the following ingredients in approximately the proportions set forth: zinc oxid 300 pounds, silica 75 pounds, linseed oil 9 gallons.

I have found that the use of certain kinds of pulverized silica as set forth above to combine with the zinc and oil to form a composition which can be readily brushed on, has an ample covering power and spreading capacity, is durable, wears evenly and will withstand the elements. If tints are desired the colors can be added in the proper quantities.

Without specifically limiting myself to the foregoing, I claim:

1. The herein-described composition of matter, consisting of zinc oxid, silica, and linseed oil, substantially as described and for the purpose specified.

2. The herein-described composition of matter, consisting of zinc oxid three hundred pounds, silica seventy-five pounds and linseed oil nine gallons, substantially as described.

NELSON B. ARNOLD.

Witnesses:
　Florence E. Prince,
　Katherine F. Arnold.